Figure 1:
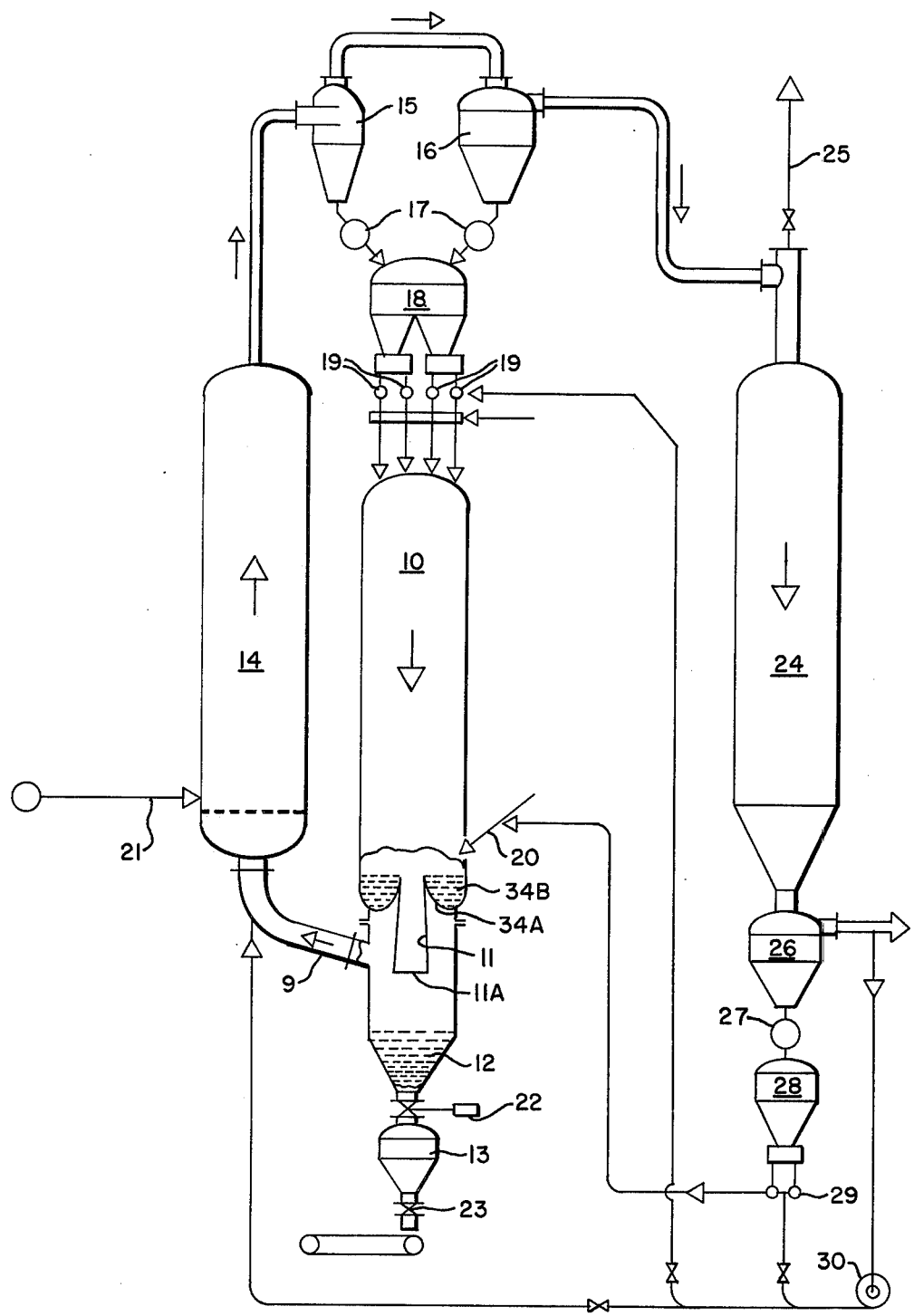

United States Patent [19]

Gernhardt et al.

[11] 3,951,615
[45] Apr. 20, 1976

[54] CYLINDRICAL PRESSURE REACTOR FOR PRODUCING A COMBUSTIBLE GAS

[75] Inventors: Paul Gernhardt; Egon Haese; Wilhelm Dangullier, all of Bochum, Germany

[73] Assignee: Dr. C. Otto & Comp. G.m.b.H., Bochum, Germany

[22] Filed: May 7, 1974

[21] Appl. No.: 467,644

[30] Foreign Application Priority Data

May 18, 1973 Germany............................ 2325204

[52] U.S. Cl........................................ 48/71; 48/69; 48/63; 48/73; 48/76; 48/77; 110/31
[51] Int. Cl.²........................................ C10J 3/48
[58] Field of Search ............... 48/69, 63, 71, 72, 73, 48/76, 77, 78, 62 R, 89, 98, 99, 100, 101, 92, 113; 23/288 G, 277 R; 110/31 X

[56] References Cited
UNITED STATES PATENTS

| 912,373 | 2/1909 | Hatton | 48/69 |
|---|---|---|---|
| 1,400,885 | 12/1921 | Koster | 48/69 |
| 2,039,175 | 4/1936 | Lindhorst | 48/69 |
| 2,645,566 | 7/1953 | Stookey | 23/277 R |

Primary Examiner—S. Leon Bashore
Assistant Examiner—Peter F. Kratz
Attorney, Agent, or Firm—Brown, Murray, Flick & Peckham

[57] ABSTRACT

The gasification of solid fuels or mixtures of solid and liquid fuels takes place in a cylindrically-shaped pressure reactor vessel having feed jets at the top of the vessel for introducing the fuel and the gasification medium into the vessel. A ring-shaped chamber containing a bath of molten iron surrounds a gas discharge pipe within the lower portion of the vessel. A water bath is established below the lower rim of the discharge pipe in the vessel and pipe means passing through the side wall of the vessel at an elevation above the lower rim of the discharge pipe and below the ring-shaped chamber discharge the gases liberated within the vessel. Reactor means are provided for utilizing the residual heat of the gases passing from the vessel. In one embodiment, the reactor means comprise a fluidized bed chamber into which coal and steam are injected to utilize the residual heat of the gases. Cyclones receive the products from the fluidized bed to separate the gases from the solid particles, the latter being introduced into the pressure reactor vessel for gasification. In a second embodiment of the reactor means, liquid fuels and the gasification medium are sprayed into a fluidized bed for utilization of the heat of the gases produced in the pressure reactor to crack the liquid fuels.

5 Claims, 2 Drawing Figures

CYLINDRICAL PRESSURE REACTOR FOR PRODUCING A COMBUSTIBLE GAS

BACKGROUND OF THE INVENTION

This invention relates to a pressure reactor for producing a combustible gas by the gasification of solid fuel or a mixture of solid and liquid fuels. The invention additionally provides an arrangement of apparatus that includes a reactor with a fluidized bed onto which solid or liquid fuel together with a gasification medium are injected for utilizing the residual heat of the gases passing from the pressure reactor.

It is well known in the art that sulfur contained in solid fuels frequently renders such fuels unsuitable for direct use as a solid fuel. This makes it necessary to extract the combustible gases from the solid fuels for use as fuel gases. The sulfur compounds which the gases contain are freed from the gases by precipitation prior to the use of the gas.

The gasification processes are frequently carried out with oxygen-enriched air or with a high percentage of oxygen along with water vapor (steam) and carbon dioxide as the gasifying medium. The gasification processes take place at such high temperatures that the uncombustible substances in the fuels occur as liquid slags. Special precautions must be taken to insure that this slag remains sufficiently fluid during the process and does not freeze. However, the difficulty often occurs that fine slag particles are carried along with the gas stream and deposited upon the colder parts of the apparatus and pipelines. The slag deposits cause stoppages and other operational breakdowns of the apparatus which is used for the gasification process.

In order to obtain a higher throughput capacity to the gasification process, techniques have been developed in which the gasification of solid fuels has been carried out at higher pressures using a cylindrical pressure reactor in the process.

SUMMARY OF THE INVENTION

It is an object of the present invention to provide a construction and operation of a pressure reactor vessel which functions at a high temperature so that a high output of gas is obtained, while at the same time, the invention provides that slag, which is initially produced in the liquid state during the gasification process, is not subject to the danger of freezing by providing that the slag is deposited in such a way and with assurance that damage will be avoided to apparatus associated with the reactor vessel.

In accordance with the present invention, means are provided in the upper part of a cylindrically-shaped pressure reactor vessel for spraying fuel and a gasification medium into the vessel, a discharge pipe in the lower part of the vessel is centrally arranged and has a cross-sectional area which is much smaller than the corresponding cross-sectional area of the reactor vessel. A ring-shaped chamber is provided with a bath of liquid iron that surrounds the discharge pipe within the vessel. Below the lower rim of the discharge pipe, a water bath is provided in the vessel. Pipe means in the side wall of the vessel remove the gas liberated therein. The pipe means are located above the lower rim of the discharge pipe. The pipe means serve to discharge the gas from the pressure vessel into means employed to utilize the available heat of the gas.

In this form of reactor vessel, enriched oxygen in combination with steam and also, if necessary, the addition of carbon dioxide, may be employed as the gasification medium in the vessel. The gases liberated in the vessel from the fuels and the gasification medium are drawn downwardly within the vessel and carry with them the resulting slag in the form of fine droplets.

The slag particles are separated from the gas as a result of the sudden reduction in the cross-sectional area to which the downwardly passing gas stream is subjected upon entering the discharge pipe which is located in the bottom portion of the vessel. For the most part, the slag particles do not follow the downward motion of the gas as it passes through the discharge pipe but, instead, the particles fall upon the bath of liquid iron contained in the chamber surrounding the discharge pipe. Slag particles entrained in the gas stream passing through the discharge pipe will fall into the water bath located below the pipe and thus will be separated out before the gas stream is withdrawn through the pipe means at the side of the vessel. The slag which is collected on the surface of the iron bath will overflow the bath from where the slag will run down along the walls of the discharge pipe and fall into the water bath below. Thus, this construction and arrangement of parts provide the advantage that when the installation is operated, the gas and slag are drawn out of the same discharge pipe in a manner which avoids the passage of essentially all highly heated liquid slag into the succeeding or downstream parts of the installation.

The gas liberated within the reactor leaves the lower end of the reactor vessel at a high temperature from where the gas is fed into an apparatus for utilizing the available heat in the gas. Different devices and procedures may be followed to utilize this residual heat.

In the event an additional obtaining of methane rich gas is envisaged by the cracking of liquid hydrocarbons, the gas produced in the reactor vessel can be fed into a fluidized bed reactor which is provided with devices for introducing by spraying, for example, liquid fuel and steam or other media to participate in the cracking of the liquid fuel. In the fluidized bed reactor, where an endothermic reaction takes place, the gas liberated in the reactor vessel is cooled to a temperature at which, for example, waste heat boilers can be heated by the residual heat remaining in the gases. The gas is then sufficiently cooled so that it can be subjected to one of the usual desulfurization treatments to remove the sulfur contained therein.

The heat which can be extracted from the gas produced in the reactor vessel can also be utilized by feeding the gas into an apparatus into which raw coal has been introduced for conversion into coke by contact with the hot gas. In this way, a fine-grain coke or semi-coke (sometimes called coalite) is produced which is separated from the gas in a cyclone-type separator. During this coking process, the gas will cool down considerably in view of the heat withdrawn from the gas to heat the raw coal. The coke is then discharged and, if necessary, introduced as a fuel into the top of the pressure reactor vessel.

A periodically operating interruptor can be incorporated in the devices employed for spraying the gasification medium into the pressure reactor vessel in order to superimpose longitudinal vibrations (i.e., localized pressure changes) to the column of gas flowing downwardly in the pressure reactor vessel.

Figure 2:
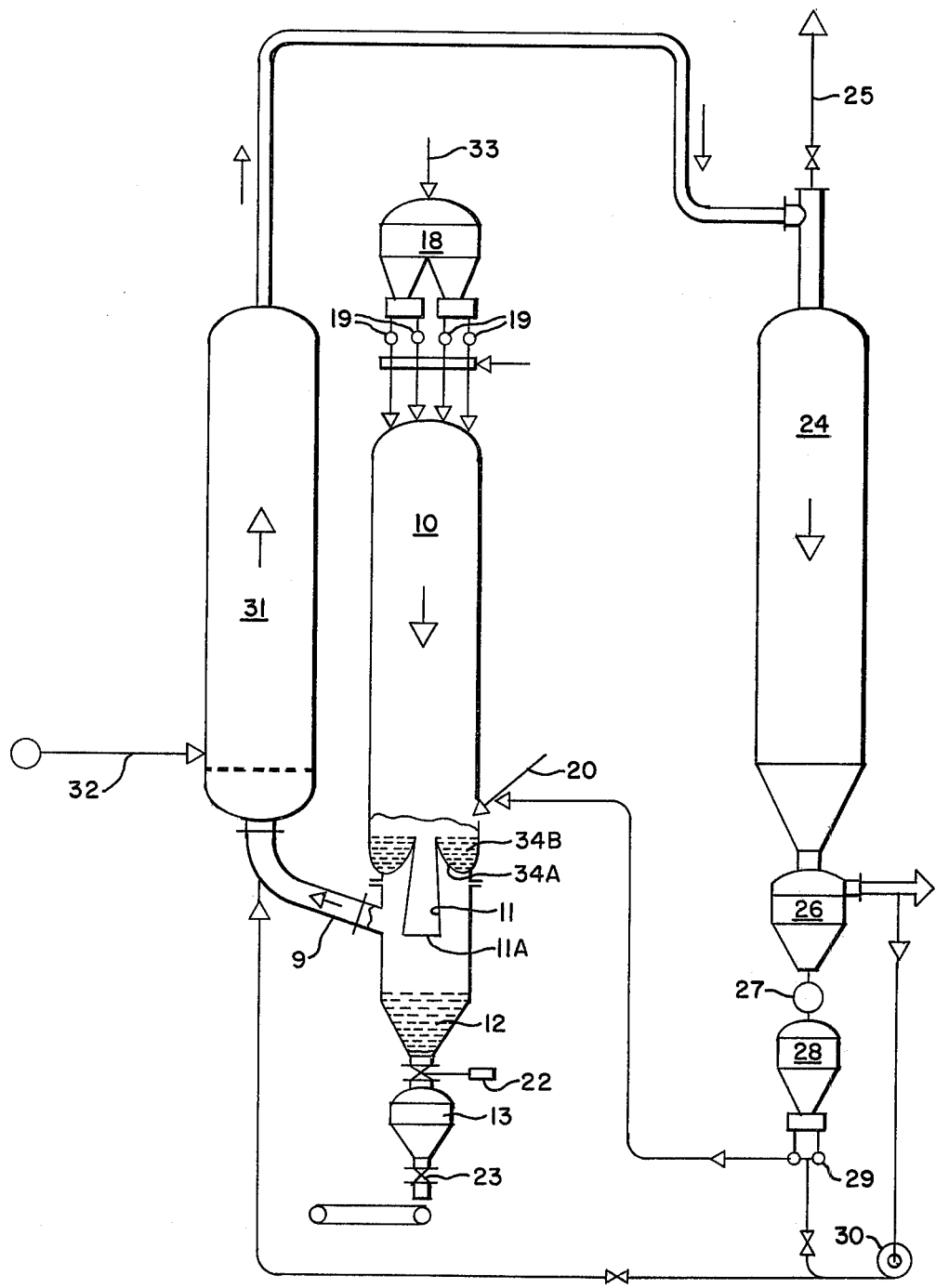

These features and advantages of the present invention as well as others will be more readily understood when the following description is read in light of the accompanying drawings, in which:

FIG. 1 is a schematic illustration of a pressure reactor vessel in a gasification system according to one embodiment of the present invention; and FIG. 2 is an illustration similar to FIG. 1 but illustrating a second embodiment of the present invention.

FIG. 1 illustrates a high temperature pressure reactor vessel 10. The internal surface of the reactor vessel is provided with a cooled refractory lining, not shown. Raw preheated fuel, consisting of solid fuel or a mixture of solid and liquid fuels along with steam and oxygen, are fed from a storage bunker 18 through a multiple system of feed jets 19 located in the top of the reactor vessel whereby the fuel is sprayed into the vessel. The primary reaction involved in the reactor vessel is the partial combustion of the fuel which generates the quantities of heat required for the further heating of the reactants as well as the necessary heat for the cracking reaction with steam along with the waste heat. A downwardly-directed and locally-turbulent gas stream is generated in which the reactions proceed. Liquid slags occur in the course of the reaction and these slags are carried along with the gas stream in the form of fine droplets of slag.

An annular plate 34A forms a container to define a ring-shaped bath of molten iron 34B which is located within the lower portion of the reactor vessel above a water-cooled base. The reservoir of molten iron surrounds a central discharge pipe 11. Due to the momentum or inertia of the particles of slag entrained in the gas moving downwardly above the iron bath, the slag particles impinge upon the iron bath whereby they are extracted from the gas stream which passes in a direction toward the central discharge pipe 11. The iron bath becomes covered with a layer of liquid slag after a short period of operation. Solid particles of incomplete gasified coke are similarly expelled from the gas stream and float for a period of time on the liquid slag. In this way, there is an additional period of time for the gasification of the coke-like solid particles. The dwell time of the particles on and above the molten slag is increased by the unavoidable turbulence that takes place near the edge of the iron bath at the entrance to the discharge pipe 11. The liquid slag floating on the bath of molten iron flows downwardly through the central discharge pipe 11 as fast as the slag is formed. A heat source 20 is provided above the iron bath. This heat source is used during the start-up operation in order to heat the iron or molten slag to a start-up temperature. The heat source 20 takes the form of a nozzle for spraying in fuel and oxygen together with, if necessary, quantities of steam.

The stream of hot gas is likewise drawn down through the central discharge pipe 11. Because the temperature of the gas must always be maintained above the liquidus temperature of the slag, the slag flowing through the discharge pipe cannot solidify. Thus, the slag remains liquid and flows downwardly along the inside wall of the discharge pipe until it drips off the lower rim 11A and falls into a water bath 12 established in the bottom of the reaction vessel. The water bath causes the slag to solidify into granular form. The water bath is coupled to a feed and cooling circuit, not shown. The granulated slag in the water bath 12 is removed at suitable time intervals by way of a pressure lock 22 into a collector chamber 13. The collector chamber is provided with a pressure lock 23 at its discharge side for delivering the granulated slag onto a conveyor or the like.

The stream of gas flowing downwardly through the discharge pipe 11 attains a greatly accelerated velocity as a result of the reduction in the cross-sectional area of the pipe as compared with the corresponding cross-sectional area of the reactor vessel. The stream of gas may carry along with it slag droplets which become separated from the gas stream at the level of the lower rim 11A of the discharge pipe. The slag separation at this point is also due to the momentum or inertia of the slag droplets which causes them to impinge upon the water bath 12 where the droplets take on a granular form. The stream of gas is deflected upwardly where it is drawn off in the direction of the arrow through a pipe 9 connected at one side of the reactor vessel. It will be observed in regard to FIG. 1, that the pipe 9 opens out of the side wall of the reactor vessel at an elevation below the bath of liquid iron and essentially above the lower rim 11A of the discharge pipe 11. The purified stream of gas which is almost free of slag and ungasified particles, is conducted by the pipe 9 to a vessel forming a fluidized bed chamber 14. Fresh coal and, if necessary, steam are injected into the chamber by nozzle 21. The reaction in the fluidized bed chamber 14 produces semi-coke by utilizing the residual heat of the hot gas. The semi-coke produced in the fluidized bed chamber 14 is conducted to a storage bunker 18 after traveling through a cyclone 15 and a multicyclone 16. Pressure locks 17 are provided in the material transfer lines interconnecting the cyclones with the bunker 18. The semi-coke then passes from the bunker into the high temperature reactor vessel 10. The gases discharged from the multicyclone 16 are passed through a heating chamber 24 wherein steam is produced utilizing the remaining residual heat of the gases. Arranged below the heating chamber 24 is a cyclone 26 used to extract residual ashes and particles of coke swept along by the gas stream through the chamber 24. A pressure lock 27 interconnects the discharge side of the cyclone with a collecting chamber 28. The residual slag and ashes are then conveyed by a conveyor 29 to the nozzle arrangement 20 where they are blown onto the slag deposited on the iron bath 34. A compressor 30 provides the driving medium used for introducing the residual slag and ashes into the pressure vessel. The compressor is supplied with gas drawn off at the discharge side of the cyclone 26. Return lines lead to the feed jets 19 and to the fluidized bed chamber 14. A torch flare 25 is located at the top of the heating vessel 24.

FIG. 2 illustrates a second embodiment of the gasification installation wherein the latent heat of the hot gas produced is used for the additional cracking processes. The layout and arrangement of parts shown in FIG. 2 are characteristically distinguishable from the previous description in regard to FIG. 1 by the omission of the cyclones 15 and 16. Where there is a similarity of parts in regard to the embodiments illustrated in FIGS. 1 and 2, the same reference numerals identify such parts in FIG. 2 and a detailed description is, therefore, deemed unnecessary. In FIG. 2, the hot gas product from the high temperature reactor vessel 10 is discharged through the pipe 9 into the vortex of a fluidized bed reactor 31 which is filled with inert and/or catalytically operating ceramic heat carriers. These heat carriers may be regenerated in a known manner using a secondary circuit, not shown in FIG. 2. Liquid hydrocarbons, some crude or residual oil, together with steam are injected by a nozzle 32 into the vortex of the fluidized bed reactor 31. The latent heat of the hot product gases is used to crack materials injected into the reactor. Raw coal or semi-coke produced independently of the process shown in FIG. 2 is fed into the high temperature reactor vessel 10 by way of nozzle 33.

In contrast with the usual procedures and installations employed for gasifying solid and/or liquid fuels in an upwardly-directed gas stream, the present invention has the decisive advantage that the velocity of the downwardly-directed stream of gas can be increased under certain conditions of temperature and pressure. Hence, the specific throughput capacity or cross-sectional loading of the reactor vessel can be increased without increasing the size of the equipment employed to remove slag and ungasified fuel particles. As the velocity of the gas in the reactor vessel is increased, there is a concomitant increase in the trapping action by the molten bath 34B for the particles of slag and solids carried along by the gas stream. These particles become separated out of the gas stream as it is deflected because of the vertical downward motion of the particles. The particles are absorbed by the surface of the bath and as a result of which more time is afforded to the gasification process before the slag discharges through the outlet pipe 11A.

The deflection of the gas stream above the water bath 12 provides a second opportunity for slag or solid particles which may be still entrained in the stream of gas to be dissociated therefrom. The effectiveness of this separating process is also increased with the increased specific throughput capacity.

It is also possible to optimize the flow conditions in the reactor by additionally incorporating diaphragms, baffle plates or the like.

In lieu of employing steam as the gasification medium, it is also possible to employ carbon dioxide or mixtures of steam and carbon dioxide. A further development employing the underlying concept of the present invention is based on superimposing longitudinal vibrations upon the stream of gas flowing downwardly within the reactor vessel in order to increase the overall reaction rate which is determined by the interchange of matter between the particles to be gasified and the gases within the flowing column. The particles of solid matter to be gasified do not participate in the vibration due to their inertia. As a result, the relative velocities between the solid particles and the surrounding gases are increased and this yields higher coefficients of material exchange. The longitudinal vibrations to the flowing gases are produced by intermittent injection of the gasification medium.

Although the invention has been shown in connection with certain specific embodiments, it will be readily apparent to those skilled in the art that various changes in form and arrangement of parts may be made to suit requirements without departing from the spirit and scope of the invention.

We claim:

1. Apparatus for producing combustible gases by the gasification of solid fuels or mixtures of solid and liquid fuels, said apparatus comprising, in combination:
   a pressure reactor vessel having a cylindrical shape and forming a reaction chamber;
   means at the top of said vessel for feeding fuel and a gasification medium into the reaction chamber of said vessel;
   a discharge pipe having a discharge opening at the lower rim thereof essentially smaller in cross section as compared with the diametrical cross section of the reaction chamber of said vessel, said discharge pipe being centrally arranged at the bottom of said reaction chamber and extending downwardly therefrom;
   a ring-shaped chamber surrounding said discharge pipe in said reaction chamber for containing a bath of molten iron;
   said pressure reactor vessel including contiguous means for establishing a water bath below the lower rim of said discharge pipe in a spaced relation below said reaction chamber;
   pipe means passing through the side wall of said means for establishing a water bath at an elevation above the lower rim of said discharge pipe and below said ring-shaped chamber for discharging gases produced in said vessel; and
   means for utilizing the available heat from the gases passing through said pipe means.

2. The apparatus according to claim 1 wherein said means for utilizing the available heat from the gases include a further reactor having a fluidized bed, and means for feeding steam and finely-divided particulate fuels into said further reactor.

3. The apparatus according to claim 2 further comprising a precipitator for separating solid materials carried by gases discharged from said further reactor.

4. The apparatus according to claim 1 wherein said means for utilizing the available heat from the gases discharged from said reactor vessel include a further reactor having a chamber for receiving the gases conducted by said pipe means, and spray means for feeding liquid fuel and a gasification medium into the chamber of said further reactor.

5. The apparatus according to claim 1 wherein said means at the top of said vessel for feeding fuel and a gasification medium into said vessel are further characterized as injection nozzles for periodically introducing the gasification medium into the top of said vessel to produce relative velocities between solid particles and the surrounding gases passing downwardly through the reactor vessel.

* * * * *